(12) United States Patent
Hung

(10) Patent No.: US 11,150,535 B2
(45) Date of Patent: *Oct. 19, 2021

(54) APPARATUS AND METHOD FOR TRANSMITTING LIGHT IN DIFFERENT DIRECTIONS BY CHANGING WAVELENGTH OF THE LIGHT

(71) Applicant: Optilab, LLC, Phoenix, AZ (US)

(72) Inventor: Henry Hung, Phoenix, AZ (US)

(73) Assignee: OPTILAB, LLC

( * ) Notice: Subject to any disclaimer, the term of this patent is extended or adjusted under 35 U.S.C. 154(b) by 624 days.

This patent is subject to a terminal disclaimer.

(21) Appl. No.: 15/983,027

(22) Filed: May 17, 2018

(65) Prior Publication Data
US 2019/0353977 A1 Nov. 21, 2019

(51) Int. Cl.
| G01S 17/93 | (2020.01) |
| G01S 7/481 | (2006.01) |
| G02F 1/295 | (2006.01) |
| H01S 3/067 | (2006.01) |
| H01S 3/08 | (2006.01) |
| H01S 3/00 | (2006.01) |
| G01S 17/931 | (2020.01) |
| H01S 3/11 | (2006.01) |
| G01S 17/89 | (2020.01) |

(52) U.S. Cl.
CPC .......... *G02F 1/2955* (2013.01); *G01S 7/4814* (2013.01); *G01S 7/4817* (2013.01); *G01S 17/931* (2020.01); *H01S 3/0071* (2013.01); *H01S 3/06787* (2013.01); *H01S 3/08086* (2013.01); *G01S 17/89* (2013.01); *G02F 2203/05* (2013.01); *H01S 3/11* (2013.01)

(58) Field of Classification Search
CPC .............. G02F 1/2955; G02F 2203/05; H01S 3/06787; H01S 3/08086; H01S 3/0071; H01S 3/11; G01S 7/4814; G01S 7/4817; G01S 17/931; G01S 7/484; G01S 17/42; G01S 17/89; G01S 17/87; G01S 17/894
USPC ........................................................ 356/5.01
See application file for complete search history.

(56) References Cited

U.S. PATENT DOCUMENTS

| 7,700,270 | B1 * | 4/2010 | Glebov | ............... G02B 5/32 |
| | | | | 430/320 |
| 9,350,452 | B2 * | 5/2016 | Hung | ............... H04J 14/0221 |
| 9,606,234 | B2 * | 3/2017 | Major, Jr. | ............ G01S 7/4868 |
| 2017/0307736 | A1 * | 10/2017 | Donovan | ............. G01S 17/931 |
| 2019/0250253 | A1 * | 8/2019 | Hung | ............... G02B 6/2804 |
| 2019/0257927 | A1 * | 8/2019 | Yao | ...................... G01S 7/4815 |

* cited by examiner

*Primary Examiner* — Daniel L Murphy
(74) *Attorney, Agent, or Firm* — Loza & Loza, LLP; George Fountain

(57) ABSTRACT

An optical signal transmitter includes a laser source configured to generate light with different wavelengths, respectively; a wavelength division (WD) demultiplexer configured to redirect the light in different directions based on the different wavelengths, respectively; and a lens array including an array of lenses configured to collimate the light from the WD demultiplexer for transmission in different directions, respectively. The optical signal transmitter may be implemented in a light detection and ranging (LIDAR) apparatus. The optical signal transmitter may further include a 1×N splitter and a set of WD demultiplexers to increase the number of distinct optical signal transmissions.

26 Claims, 6 Drawing Sheets

APPARATUS AND METHOD FOR TRANSMITTING LIGHT IN DIFFERENT DIRECTIONS BY CHANGING WAVELENGTH OF THE LIGHT

BACKGROUND

Field

Aspects of the present disclosure relate generally to optical systems, and in particular, to an apparatus and method for transmitting light in different directions by changing wavelength of the light.

Background

Light detection and ranging (LIDAR) systems (or sometimes referred to as "light imaging, detection, and ranging" systems) are typically used to detect and/or map a target object-of-interest. For example, LIDAR systems may be employed in vehicles to detect other vehicles and objects in proximity for collision warning and avoidance and/or autonomous navigation purposes. Another example is an airborne LIDAR system used for three-dimensional (3D) terrain mapping.

In a LIDAR system, a transmitter transmits an optical signal towards a target object-of-interest for detection and/or mapping purposes. The transmitted optical signal reflects off the target object and propagates back towards the LIDAR system. The LIDAR system includes a receiver, which detects the reflected optical signal and converts it into a digital signal for processing. Depending on the application, the LIDAR system may determine information about the target object, such as its distance, velocity, acceleration, surface contours, etc.

This disclosure relates to optical signal transmission and/or receiving systems that may be useful in many applications, including LIDAR systems as described above.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus, which may be configured as an optical signal transmitter or part of a light detection and ranging (LIDAR) apparatus, including a laser source configured to generate light with different wavelengths, respectively; a wavelength division (WD) demultiplexer configured to redirect the light in different directions based on the different wavelengths, respectively; and a lens array including an array of lenses configured to collimate the light from the WD demultiplexer for transmission in different directions, respectively.

Another aspect of the disclosure relates to an apparatus, which may be configured as a light detection and ranging (LIDAR) apparatus, includes a laser source configured to generate a set of transmit light pulses with different wavelengths, respectively; a wavelength division (WD) multiplexer-demultiplexer configured to redirect the transmit light pulses from an input to different regions based on the different wavelengths, respectively, and redirect received light pulses from the different regions to the input; a lens array including an array of lenses configured to collimate the transmit light pulses from the WD multiplexer-demultiplexer for transmission in different directions, respectively, and collimate the received light pulses, resulting from the transmit light pulses reflecting off at least one object, for routing to the different regions of the WD multiplexer-demultiplexer, respectively; at least one photodiode detector configured to generate electrical signals based on the received light pulses, respectively; and an optical coupler configured to direct the transmit light pulses from the laser source to the input of the WD multiplexer-demultiplexer, and direct the received light pulses from the input of the WD multiplexer-demultiplexer to the at least one photodiode detector.

Another aspect of the disclosure relates to a vehicle including a LIDAR apparatus as defined above that uses information based on the electrical signals to assist in driving or autonomously drive to a destination.

Another aspect of the disclosure relates to an apparatus, which may be configured as an optical signal transmitter or part of a light detection and ranging (LIDAR) apparatus, including a laser source configured to generate light with different wavelengths; a 1×N optical splitter configured to power split the light from the laser source to generate a set of optical signals; and a set of wavelength division (WD) demultiplexers configured to wavelength split the optical signals to generate a set of transmit optical signals with different wavelengths in different wavelength ranges, respectively.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
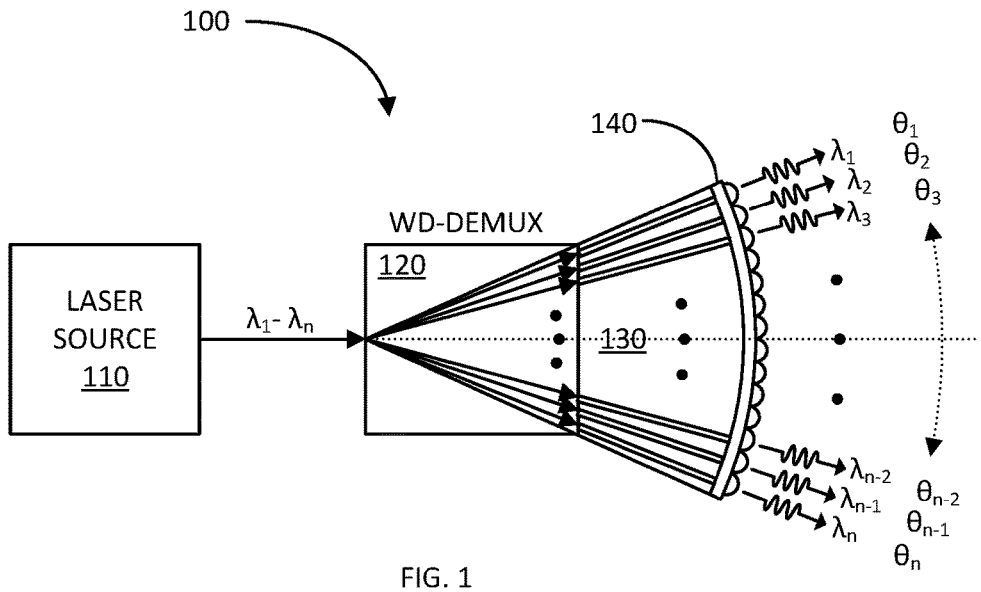
FIG. 1 illustrates a block diagram of an exemplary optical signal transmitter in accordance with an aspect of the disclosure.

FIG. 1 illustrates a block diagram of an exemplary optical signal transmitter 100 in accordance with an aspect of the disclosure. In summary, the optical signal transmitter 100 is configured to transmit light in different directions by changing the wavelength of the light. As an example, the optical signal transmitter 100 may be configured to change the wavelength of the light in a particular pattern to effectuate a desired angular scanning transmission. This may be useful in light detection and ranging (LIDAR) systems. As discussed below in detail, an advantage of the optical signal transmitter 100 is that no moving parts are required to effectuate the change in the direction of the light transmission.

In particular, the optical signal transmitter 100 includes a laser source 110, a wavelength division demultiplexer (WD-Demux) 120, an optical signal routing device 130, and an array of lenses 140. The laser source 110 is configured to generate a light signal with a wavelength that may be changed (e.g., swept) between $\lambda_1$ to $\lambda_n$. As an example, the wavelength may be continuously swept between $\lambda_1$ to $\lambda_n$ in a round-robin or forward-and-backward manner. It shall be understood that the changing of the wavelength in the range of $\lambda_1$ to $\lambda_n$ may be performed in any desired manner.

The WD-Demux 120 redirects the light signal from the laser source 110 in different directions based on the wavelength of the signal. As an example, the WD-Demux 120 redirects the light with a wavelength $\lambda_1$ in an upper-rightward direction (e.g., +22° from horizontal) as seen in the diagram of FIG. 1. Similarly, the WD-Demux 120 redirects the light with a wavelength $\lambda_n$ in a lower-rightward direction (e.g., −22° from horizontal) as seen in the diagram of FIG. 1. The WD-Demux 120 may redirect light with wavelengths between from $\lambda_2$ to $\lambda_{n-1}$ in directions ranging from +18.5° to −18.5° in steps of 3.5°, respectively. It shall be understood that the angular range of 44° and the angular resolution of 3.5° may be set differently as desired.

The optical signal routing device 130 is configured to route the redirected optical signals from the WD-Demux 120 to individual lenses of the lens array 140. As an example, the optical signal routing device 130 may route the light with wavelength $\lambda_1$ to the upper-most lens of the lens array 140 as seen in FIG. 1. Similarly, the optical signal routing device 130 may route the light with wavelength $\lambda_n$ to the lower-most lens of the lens array 140 as seen in FIG. 1. For other wavelengths $\lambda_2$ to $\lambda_{n-1}$, the optical signal routing device 130 routes the light to the lenses of the lens array 140 from the second upper-most lens to the second lower-most, respectively.

The lenses of the lens array 140 are each configured to collimate the light it receives from the optical signal routing device 130 for transmission into free space. As an example, the upper-most lens of the lens array 140 collimates the light with wavelength $\lambda_1$ from the optical signal routing device 130 for propagation into free space along an angular direction $\theta_1$. Similarly, the lower-most lens of the lens array 140 collimates the light with wavelength $\lambda_n$ from the optical signal routing device 130 for propagation into free space along an angular direction $\theta_n$. The other lenses of the lens array 140 collimate the light with wavelengths $\lambda_2$ to $\lambda_{n-1}$ from the optical signal routing device 130 for propagation into free space along angular directions $\theta_2$ to $\theta_{n-1}$, respectively. The lens array 140 may be configured as an integral (single-piece) piece of plastic or other suitable lens material, which may be formed via a molding, 3D-printing, or other process for making integral components.

The optical signal transmitter 100 may be configured to effectuate an azimuth (or other type of) scan by changing in a time-basis (e.g., periodic) the wavelength of the light emitted by the swept laser source 110. This is explained below with reference to the following example.

Figure 2:
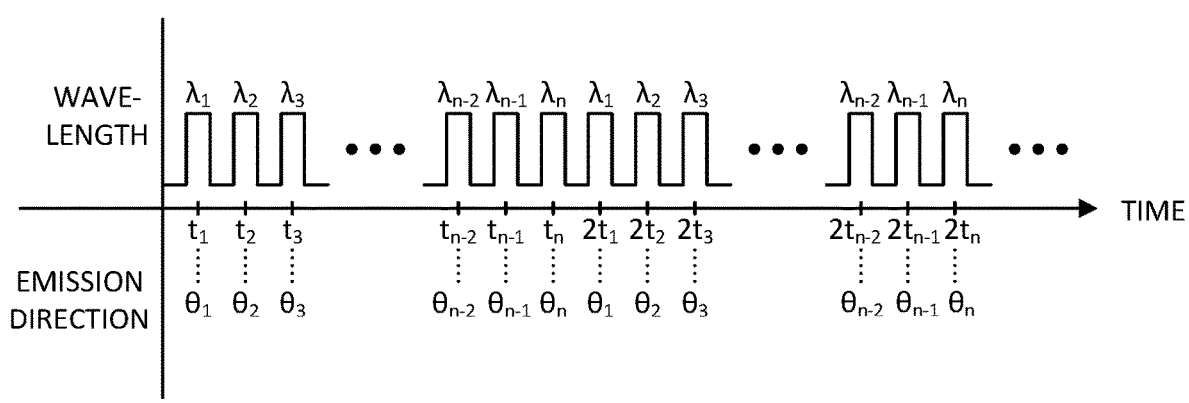
FIG. 2 illustrates a diagram of an exemplary signal transmission operation of an optical signal transmitter in accordance with another aspect of the disclosure.

FIG. 2 illustrates a diagram of an exemplary signal transmission operation of the optical signal transmitter 100 in accordance with another aspect of the disclosure. The diagram includes a central horizontal axis representing time. Above the central time axis is a row representing the wavelength of the light emitted by the optical signal transmitter 100. Below the central time axis is another row representing the direction of the light transmitted by the optical signal transmitter 100.

Thus, according to the wavelength portion of the graph, at time $t_1$, the laser source 110 is controlled to generate a pulse of light with a wavelength $\lambda_1$. Due to the wavelength $\lambda_1$, the WD-Demux 120 redirects the light pulse to the upper-most optical path of the optical signal routing device 130. The optical signal routing device 130 routes the light pulse to the upper-most lens of the lens array 140. The upper-most lens collimates the light pulse for transmission into free space along angular direction $\theta_1$. Thus, according to the emission direction portion of the graph, the light pulse is transmitted into free space along the $\theta_1$ angular direction.

Similarly, according to the graph, at time $t_2$, the laser source 110 generates a light pulse with a wavelength $\lambda_2$, which is routed to the second upper-most lens of the lens array 140 by the WD-Demux 120 and the optical signal routing device 130 for transmission into free space along the $\theta_2$ angular direction. As depicted in the graph, this process continues where the optical signal transmitter 100 transmits light pulses with wavelengths $\lambda_3$ to $\lambda_{n-2}$, $\lambda_{n-1}$, and $\lambda_n$ into free space in angular directions $\theta_3$ to $\theta_{n-2}$, $\theta_{n-1}$, and $\theta_n$ at times $t_3$ to $t_{n-2}$, $t_{n-1}$, and $t_n$, respectively.

Also, as indicated in the wavelength portion of the graph, the process of transmitting light pulses with wavelengths $\lambda_1$ to $\lambda_n$ may be repeated as desired. For example, as illustrated, at times $2t_1$ to $2t_n$, the optical signal transmitter 100 transmits light pulses with wavelength $\lambda_1$ to $\lambda_n$ into free space along angular directions $\theta_1$ to $\theta_n$, respectively. This is an example of a round-robin sweeping pattern. A forward-and-backward sweeping pattern entails the light wavelength being changed in a forward direction from $\lambda_1$ to $\lambda_n$ and then in a back direction from $\lambda_n$ to $\lambda_1$, and repeated as desired. Again, it shall be understood that the wavelength of the light emitted by the laser source 110 may be changed in any desired pattern.

Thus, the optical signal transmitter 100 may transmit optical signals in a direction sweeping manner to effectuate a scan for LIDAR applications, such as vehicle collision detection and avoidance, and 3D-surface mapping, as previously discussed. As explained, the optical signal transmitter accomplishes the scan without any moving parts, which reduces parts wear and tear, maintenance, and failures due to moving parts, as well as effectuate the scan at a much faster rate. Although, in this example, the light emitted by the laser source 110 is pulsed, it shall be understood that the laser source may emit continuous wave (CW) light.

Figure 3:
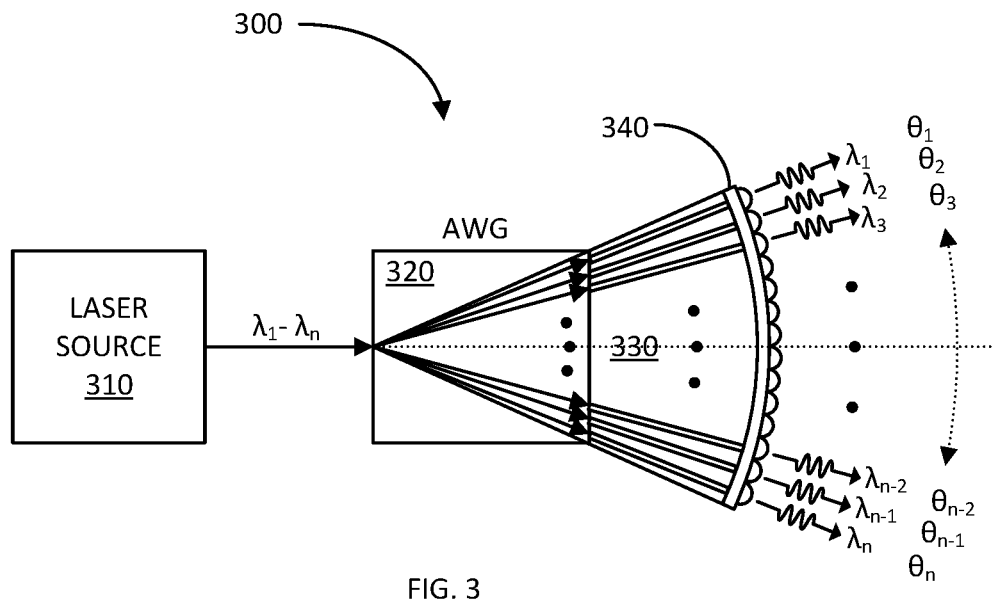
FIG. 3 illustrates a block diagram of another exemplary optical signal transmitter in accordance with another aspect of the disclosure.

FIG. 3 illustrates a block diagram of another exemplary optical signal transmitter 300 in accordance with another aspect of the disclosure. The optical signal transmitter 300 is a variation of the optical signal transmitter 100 previously discussed. However, in this example, the WD-Demux 120 is configured as an array waveguide grating (AWG) device for redirecting light with different wavelengths towards separate lenses of a lens array as previously discussed.

Accordingly, the optical signal transmitter 300 includes a laser source 310 configured to generate light with different wavelengths $\lambda_1$ to $\lambda_n$ in a sweeping or other manner as previously discussed. The optical signal transmitter 300 further includes an array waveguide grating (AWG) device 320 for redirecting the light emitted by the laser source 310 in different directions based on the different wavelengths $\lambda_1$ to $\lambda_n$, respectively. Additionally, the optical signal transmitter 300 includes an optical signal routing device 330 for routing the light of different wavelengths $\lambda_1$ to $\lambda_n$ to individual lenses of a lens array 340. The lenses of the lens array 340 are configured to collimate the light of different wavelengths $\lambda_1$ to $\lambda_n$ for transmission in different directions $\theta_1$ to $\theta_n$, respectively. Thus, the optical signal transmitter 300 may be configured to perform a sweeping optical signal transmission for LIDAR applications without requiring moving parts.

Figure 4:
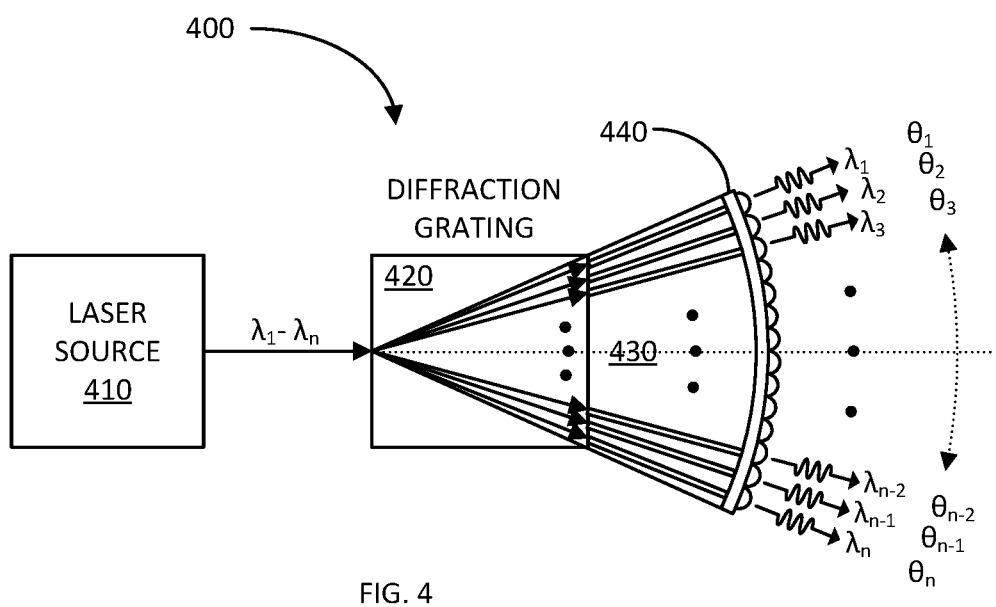
FIG. 4 illustrates a block diagram of another exemplary optical signal transmitter in accordance with another aspect of the disclosure.

FIG. 4 illustrates a block diagram of another exemplary optical signal transmitter 400 in accordance with another aspect of the disclosure. The optical signal transmitter 400 is another variation of the optical signal transmitter 100 previously discussed. However, in this example, the WD-Demux 120 is configured as a diffraction grating device for redirecting light with different wavelengths towards separate lenses of a lens array as previously discussed.

Accordingly, the optical signal transmitter 400 includes a laser source 410 configured to generate light with different wavelengths $\lambda_1$ to $\lambda_n$ in a sweeping or other manner as previously discussed. The optical signal transmitter 400 further includes a diffraction grating device 420 for redirecting the light emitted by the laser source 410 in different directions based on the different wavelengths $\lambda_1$ to $\lambda_n$, respectively. Additionally, the optical signal transmitter 400 includes an optical signal routing device 430 for routing the light of different wavelengths $\lambda_1$ to $\lambda_n$ to individual lenses of a lens array 440. The lenses of the lens array 440 are configured to collimate the light of different wavelengths $\lambda_1$ to $\lambda_n$ for transmission in different directions $\theta_1$ to $\theta_n$, respectively. Thus, the optical signal transmitter 400 may be configured to perform a sweeping optical signal transmission for LIDAR applications without requiring moving parts.

Figure 5:
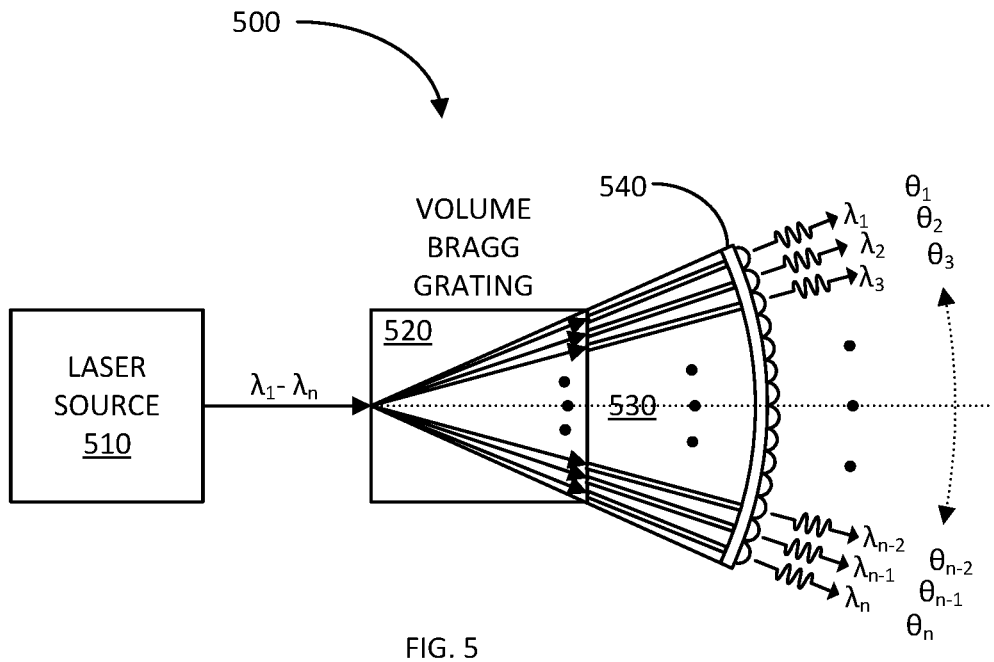
FIG. 5 illustrates a block diagram of another exemplary optical signal transmitter in accordance with another aspect of the disclosure.

FIG. 5 illustrates a block diagram of another exemplary optical signal transmitter 500 in accordance with another aspect of the disclosure. The optical signal transmitter 500 is another variation of the optical signal transmitter 100 previously discussed. However, in this example, the WD-Demux 120 is configured as a volume Bragg grating device for redirecting light with different wavelengths towards separate lenses of a lens array as previously discussed.

Accordingly, the optical signal transmitter 500 includes a laser source 510 configured to generate light with different wavelengths $\lambda_1$ to $\lambda_n$ in a sweeping or other manner as previously discussed. The optical signal transmitter 500 further includes a volume Bragg grating device 520 for redirecting the light emitted by the laser source 510 in different directions based on the different wavelengths $\lambda_1$ to $\lambda_n$, respectively. Additionally, the optical signal transmitter 500 includes an optical signal routing device 530 for routing the light of different wavelengths $\lambda_1$ to $\lambda_n$ to individual lenses of a lens array 540. The lenses of the lens array 540 are configured to collimate the light of different wavelengths $\lambda_1$ to $\lambda_n$ for transmission in different directions $\theta_1$ to $\theta_n$, respectively. Thus, the optical signal transmitter 500 may be configured to perform a sweeping optical signal transmission for LIDAR applications without requiring moving parts.

Figure 6:
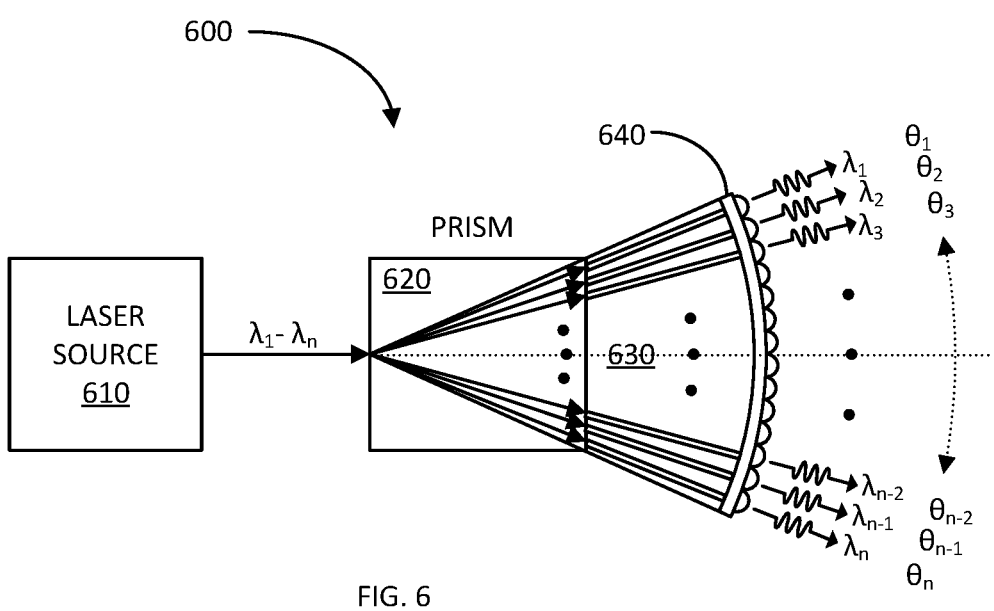
FIG. 6 illustrates a block diagram of another exemplary optical signal transmitter in accordance with another aspect of the disclosure.

FIG. 6 illustrates a block diagram of another exemplary optical signal transmitter 600 in accordance with another aspect of the disclosure. The optical signal transmitter 600 is another variation of the optical signal transmitter 100 previously discussed. However, in this example, the WD-Demux 120 is configured as a prism for redirecting light with different wavelengths towards separate lenses of a lens array as previously discussed.

Accordingly, the optical signal transmitter 600 includes a laser source 610 configured to generate light with different wavelengths $\lambda_1$ to $\lambda_n$ in a sweeping or other manner as previously discussed. The optical signal transmitter 600 further includes a prism 620 for redirecting the light emitted by the laser source 610 in different directions based on the different wavelengths $\lambda_1$ to $\lambda_n$, respectively. Additionally, the optical signal routing device 630 for routing the light of different wavelengths $\lambda_1$ to $\lambda_n$ to individual lenses of a lens array 640. The lenses of the lens array 640 are configured to collimate the light of different wavelengths $\lambda_1$ to $\lambda_n$ for transmission in different directions $\theta_1$ to $\theta_n$, respectively. Thus, the optical signal transmitter 600 may be configured to perform a sweeping optical signal transmission for LIDAR applications without requiring moving parts.

Figure 7:
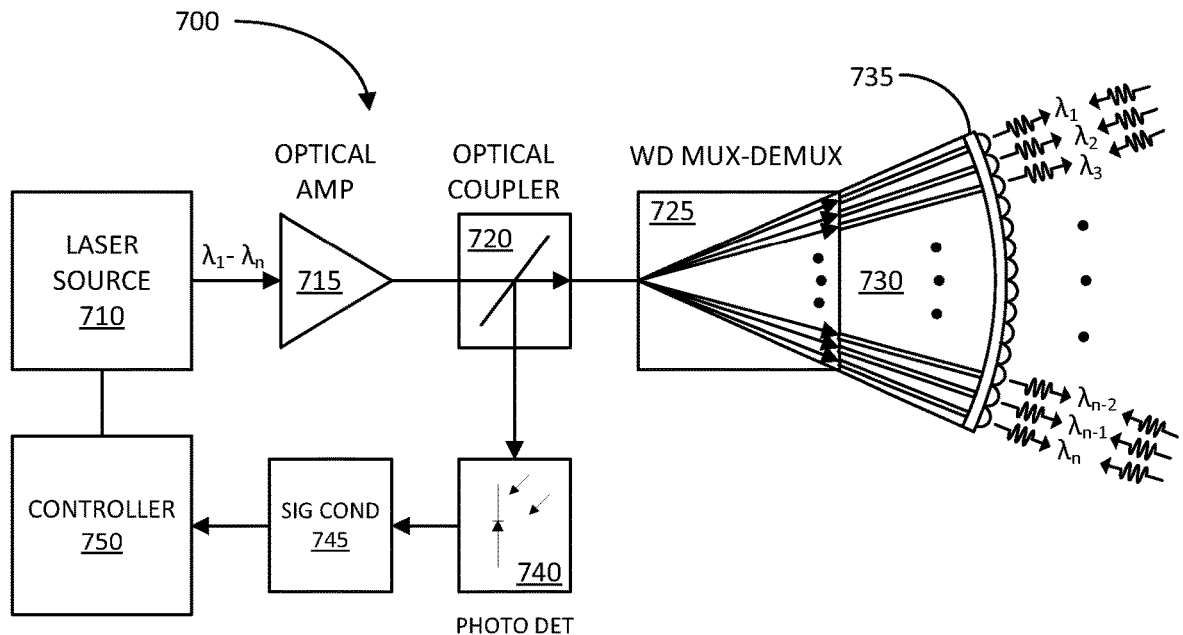
FIG. 7 illustrates a block diagram of an exemplary light detection and ranging (LIDAR) apparatus in accordance with another aspect of the disclosure.

FIG. 7 illustrates a block diagram of an exemplary light detection and ranging (LIDAR) apparatus 700 in accordance with another aspect of the disclosure. In summary, the LIDAR apparatus 700 employs the features of the optical signal transmitters previously discussed to effectuate a scan based on the LIDAR application being performed.

In particular, the LIDAR apparatus 700 includes a laser source 710, an optical amplifier 715, an optical coupler 720, a wavelength division (WD) multiplexer-demultiplexer 725, an optical signal routing device 730, and a lens array 735. Additionally, the LIDAR apparatus 700 includes a photodiode detector 740, a signal conditioner 745, and a controller 750.

Under the control of the controller 750, the laser source 710 is configured to emit light (e.g., light pulses) with different wavelengths $\lambda_1$ to $\lambda_n$ at different times $t_1$ to $t_n$ to effectuate a sweeping or other optical signal transmitting spatial pattern, respectively.

The optical amplifier 715 is configured to amplify the light emitted by the laser source 710. As an example, the optical amplifier 715 may be configured as an erbium-doped fiber amplifier (EDFA), a ytterbium-doped fiber amplifier (YDFA), or an erbium-ytterbium-doped fiber amplifier (EY-DFA).

The optical coupler 720 passes the amplified light generated by the optical amplifier 715 to the input of the WD multiplexer-demultiplexer 725, and redirects received (e.g., object-reflected) light from the WD multiplexer-demultiplexer 725 to the photodiode detector 740.

The WD multiplexer-demultiplexer 725 operates as a demultiplexer by redirecting the light received from the optical coupler 720 in different directions depending on the wavelength of the light as previously discussed. The WD multiplexer-demultiplexer 725 also operates as a multiplexer by redirecting the received light from the optical signal routing device 730 to the optical coupler 720. As previously discussed, the WD multiplexer-demultiplexer 725 may be configured as an array waveguide grating (AWG) device, diffraction grating device, volume Bragg grating device, or a prism.

The optical signal routing device 730 routes the light of different wavelengths $\lambda_1$ to $\lambda_n$ to different collimating lenses of the lens array 735. The optical signal routing device 730 also routes the received light from the lenses of the lens array 735 to the WD multiplexer-demultiplexer 725.

The lens array 735 includes an array of lenses for collimating light received from the optical signal routing device 730 for transmission of the light into free space along different angular directions $\theta_1$ to $\theta_n$, respectively. The transmitted light is incident light upon at least one target object-of-interest. The lenses of the lens array 735 also collimate the received light (resulting from reflected light off the target object due to the incident light) for routing to the WD multiplexer-demultiplexer 725 by the optical signal routing device 730.

The photodiode detector 740 converts the received light from the optical coupler 740 into an electrical signal. The signal conditioner 745 conditions the electrical signal generated by the photodiode detector 740 for reception by the controller 750. As an example, the signal conditioner 745 may include filters for reducing noise from the electrical signal, an amplifier for amplifying the electrical signal for improved analog-to-digital conversion, and an analog-to-digital converter (ADC) for converting the electrical signal into a digital signal for reception by the controller 750. It shall be understood that the signal conditioner 745 may include other or additional components for performing desired signal conditioning upon the electrical signal generated by the photodiode detector 740.

The controller 750 controls the operation of the LIDAR system 100 and determines information about the target object based on the signal received from the signal conditioner 745. For example, the controller 750 may control the laser source 710 to generate light pulses with different wavelengths $\lambda_1$ to $\lambda_n$ at different times $t_1$ to $t_n$ to effectuate a sweeping or other optical signal transmission pattern by the LIDAR apparatus 700, respectively. The controller 750 may also analyze the signal received from the signal conditioner 745 to determine one or more characteristics of the target object based on the particular LIDAR application being employed. As an example, the controller 750 may determine the distances between the target object and the LIDAR apparatus, the velocity of the target object, acceleration of the target object, the surface contours of the target object, and other characteristics.

Because features of the optical signal transmitters previously discussed are implemented in the LIDAR apparatus 700, the apparatus 700 may perform LIDAR scans without requiring moving parts. This has substantial benefits in reduction in power consumption by the LIDAR apparatus, faster scanning may be performed by the LIDAR apparatus, less susceptible to failure due to no moving parts, and lower wear and tear and maintenance requirements for the LIDAR apparatus.

Figure 8:
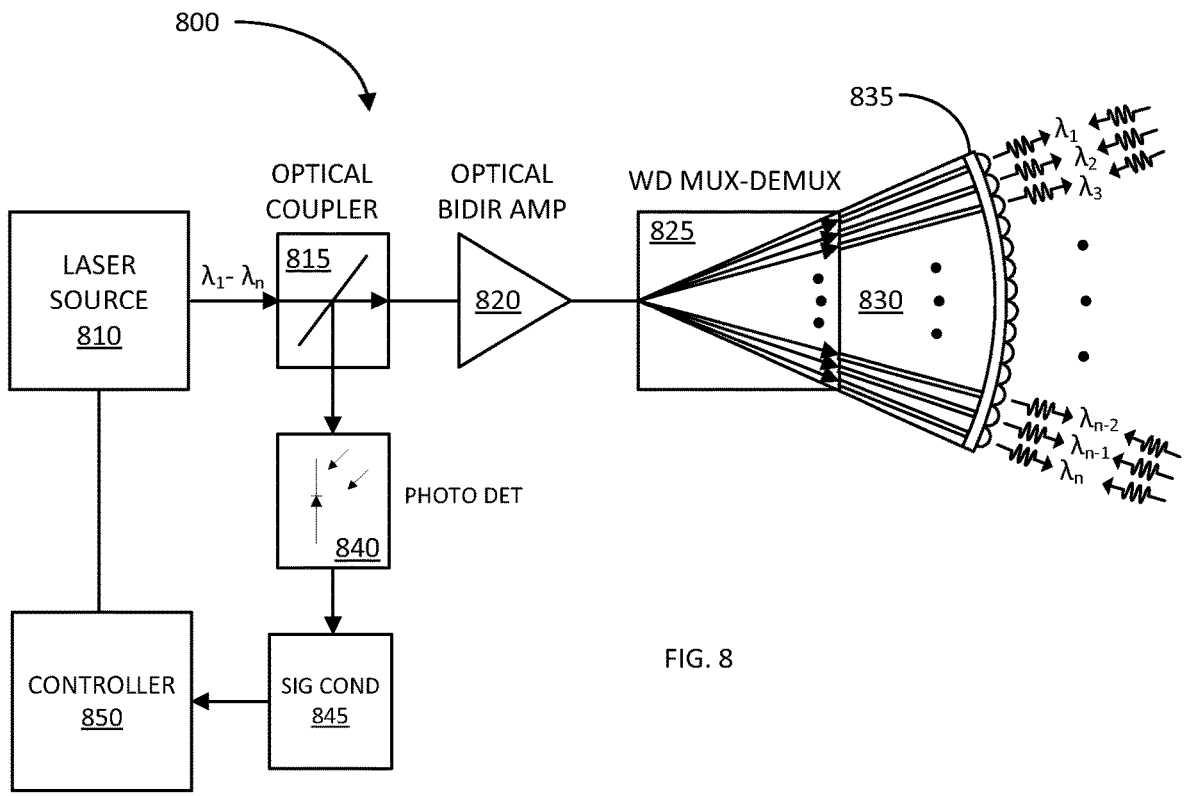
FIG. 8 illustrates a block diagram of another exemplary LIDAR apparatus in accordance with another aspect of the disclosure.

FIG. 8 illustrates a block diagram of another exemplary LIDAR apparatus 800 in accordance with another aspect of the disclosure. The LIDAR apparatus 800 is a variation of the LIDAR apparatus 700 previously discussed. In particular, the LIDAR apparatus 800 positions the optical coupler before or upstream of the optical amplifier, and the optical amplifier is configured as a bidirectional optical amplifier.

More specifically, the LIDAR apparatus 800 includes a laser source 810, an optical coupler 815, a bidirectional optical amplifier 820, a wavelength division (WD) multiplexer-demultiplexer 825, an optical signal routing device 830, and a lens array 840. The LIDAR apparatus 800 further includes a photodiode detector 840, a signal conditioner 845, and a controller 850. The operations of these devices are basically the same as the corresponding devices of LIDAR apparatus 700 with the exception that the optical amplifier 820 is bidirectional.

That is, the bidirectional optical amplifier 820 amplifies the light emitted by the laser source 810 received via the optical coupler 815 for transmission into free space by the lens array 835. The bidirectional optical amplifier 820 also amplifies the received (object-reflected) light from the target object via the lens array 835, optical signal routing device 830, and WD multiplexer-demultiplexer 825 for subsequent detection by the photodiode detector 840 via the optical coupler 815.

Similar to LIDAR apparatus 700, the LIDAR apparatus 800 may perform LIDAR scans without requiring moving parts. This has substantial benefits in reduction in power consumption by the LIDAR apparatus, faster scans may be performed by the LIDAR apparatus, less susceptible to failure due to no moving parts, and lower wear and tear and maintenance requirements for the LIDAR apparatus.

Figure 9:
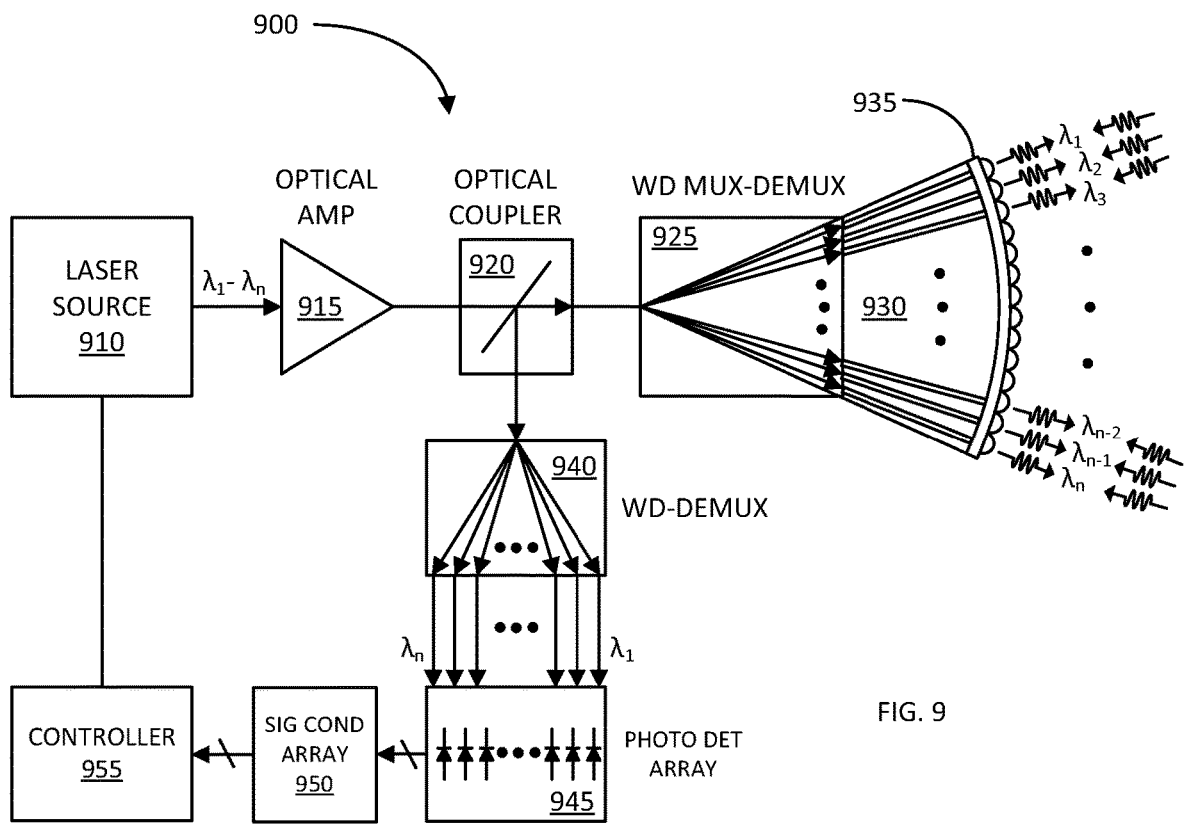
FIG. 9 illustrates a block diagram of another exemplary LIDAR apparatus in accordance with another aspect of the disclosure.

FIG. 9 illustrates a block diagram of another exemplary LIDAR apparatus 900 in accordance with another aspect of the disclosure. The LIDAR apparatus 900 is a variation of the LIDAR apparatus 700 previously discussed. In particular, the LIDAR apparatus 900 additionally includes a WD demultiplexer for separating the received (object-reflected) light by wavelengths, a photodiode detector array for generating separate electrical signals based on the different wavelengths of the received light, and a signal conditioner array for conditioning the electrical signals from the photo detector array for reception by a controller, respectively. This configuration eliminates ambiguity from which transmitted optical signals $\lambda_1$ to $\lambda_n$ are the received light derived. In the previous implementations 700 and 800, the ambiguity may be resolved by spacing the light pulses such that the expected reflected light pulse is received before the transmission of the next light pulse.

In particular, the LIDAR apparatus 900 includes a laser source 910, an optical amplifier 915, an optical coupler 920, a wavelength division (WD) multiplexer-demultiplexer 925, an optical signal routing device 930, and a lens array 935. The LIDAR apparatus 900 further includes a WD demultiplexer 940, a photodiode detector array 945, a signal conditioner array 950, and a controller 955. The operations of these devices are basically the same as the corresponding devices of LIDAR apparatus 700 with the exception of the additional WD-Demux 940, the photodiode detector array 945, and the signal conditioner array 950.

The WD-Demux 940 receives the received (object-reflected) light from the optical coupler 920 and redirects the light based on its wavelength. As an example, if the received light has a wavelength $\lambda_1$, the WD-Demux 940 redirects the light to the right-most region of the WD-Demux as seen in the diagram. If the received light has a wavelength $\lambda_n$, the WD-Demux 940 redirects the light to the left-most region of the WD-Demux as seen in the diagram. The WD-Demux 940 redirects the received light with wavelengths $\lambda_2$ to $\lambda_{n-1}$ continuously from right to left regions of the WD-Demux as seen in the diagram. The separated received light with wavelengths $\lambda_1$ to $\lambda_n$ correspond to the reflected light from the target object due to the incident transmitted light with wavelengths $\lambda_1$ to $\lambda_n$, respectively. Thus, this eliminates the ambiguity between the transmitted light and the corresponding target-reflected light.

The received light with wavelengths $\lambda_1$ to $\lambda_n$ are applied to separate photodiodes of the photodiode detector array 945 for generating corresponding electrical signals. The electrical signals are applied to separate signal conditioners of the signal conditioner array 950 for generating corresponding signals (e.g., digital signals) for reception by the controller 955. As in the previous implementation 800, the controller 955 analyzes the signals from the signal conditioner array 950 to determine one or more characteristics of the target object.

Figure 10:
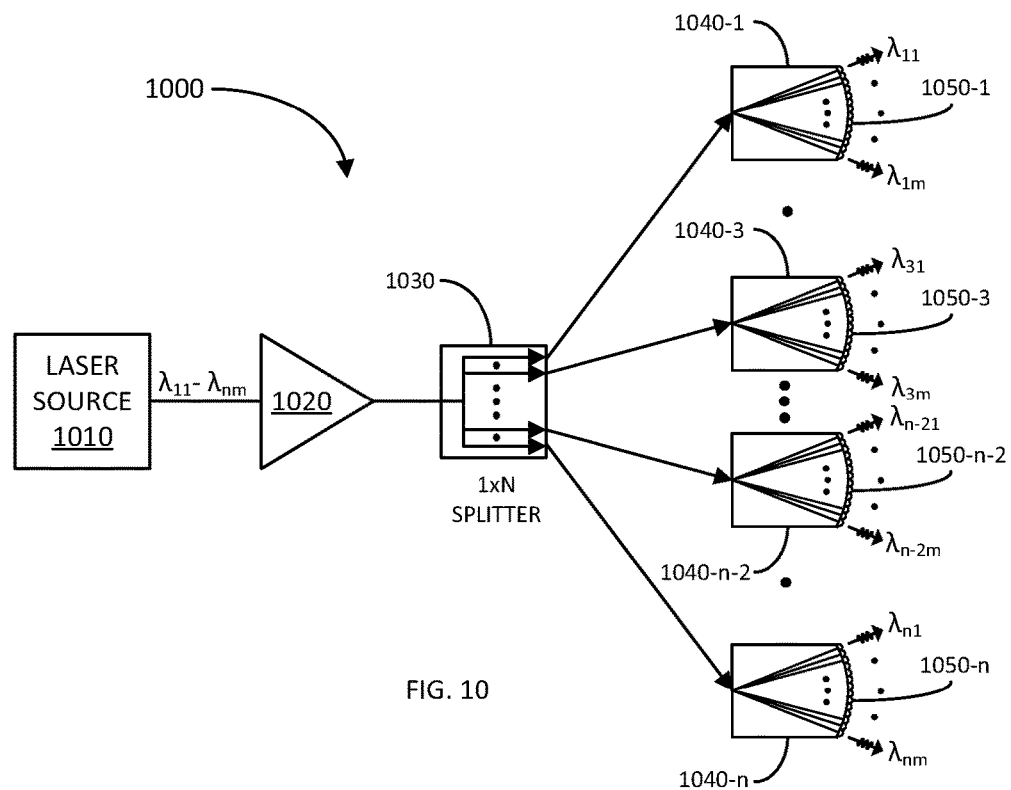
FIG. 10 illustrates a block diagram of another exemplary optical signal transmitter in accordance with another aspect of the disclosure.

FIG. 10 illustrates a block diagram of another exemplary optical signal transmitter 1000 in accordance with another aspect of the disclosure. In summary, the optical signal transmitter 1000 includes a 1×N splitter and a set of WD-Demuxes (or multiplexers-demultiplexer) configured to increase the number of transmitted optical signals with different wavelengths.

In particular, the optical signal transmitter 1000 includes a laser source 1010, an optical amplifier 1020, a 1×N splitter 1030, a set of WD-Muxes 1040-1 to 1040-$n$, and a set of lens arrays 1050-1 to 1050-$n$. As in the previous implementations, the laser source 1010 is configured to generate light (e.g., light pulses or continuous wave (CW)) with different wavelengths $\lambda_{11}$ to $\lambda_{nm}$ and optionally at different times $t_1$ to $t_n$, respectively. The optical amplifier 1020 amplifies the light generated by the laser source 1010. The optical amplifier 1020 may be configured as an erbium-doped fiber amplifier (EDFA), a ytterbium-doped fiber amplifier (YDFA), or an erbium-ytterbium-doped fiber amplifier (EYDFA), and may be configured bidirectional depending on the application for the optical signal transmitter 1000.

The 1×N splitter 1030 power splits the light from the optical amplifier 1020 to generate a set of N-optical signals. The N-optical signals are applied to inputs of the set of WD-Demuxes 1040-1 to 1040-$n$, respectively. The WD-Demuxes 1040-1 to 1040-$n$ are configured to separate optical signals into different wavelengths in distinct wavelength bands. For example, the WD-Demux 1040-1 redirects one of the optical signal based on different wavelengths to generate transmit signals with wavelengths $\lambda_{11}$ to $\lambda_{1m}$. The WD-Demux 1040-$n$ redirects another one of the optical signal based on different wavelengths to generate another set of transmit signals with wavelengths $\lambda_{n1}$ to $\lambda_{nm}$. The remaining WD-Demuxes 1040-2 to 1040-$n$−1 redirects the other optical signals based on different wavelengths to generate other sets of transmit signals with wavelengths $\lambda_{21}$-$\lambda_{2m}$ to $\lambda_{n-11}$-$\lambda_{n-1m}$, respectively. The set of lens arrays 1050-1 to 1050-$n$ collimate the transmit signals with wavelengths $\lambda_{21}$-$\lambda_{2m}$ to $\lambda_{n-11}$-$\lambda_{n-1m}$ for transmission into free space, respectively.

As an example, if n is 64 and m is 100, then the total number of distinct optical signal transmissions of the optical signal transmitter 1000 is 6400. These many distinct optical signal transmissions facilitate high resolution detection and/or imaging of objects-of-interest in a LIDAR system. It shall be understood that the optical signal transmitter 1000 may be configured to produce any number of distinct optical signal transmissions. Further, it shall be understood that the optical signal transmitter 1000 may be implemented into a LIDAR apparatus, such as LIDAR apparatuses 500, 600, and 700.

Figure 11:
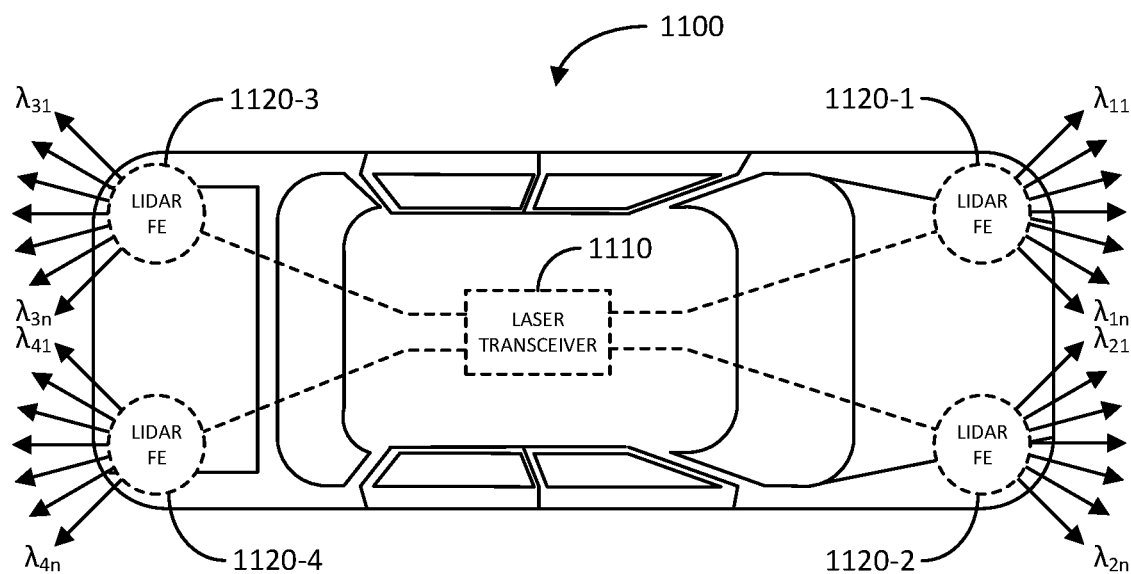
FIG. 11 illustrates a top view of an exemplary vehicle including a LIDAR apparatus for autonomous or assisted-driving applications in accordance with another aspect of the disclosure.

FIG. 11 illustrates a top view of an exemplary vehicle 1100 including a LIDAR apparatus for autonomous or assisted-driving applications in accordance with another aspect of the disclosure. The vehicle 1100 may be any type of vehicle, such as land transportation (e.g., car, truck, etc.), water transportation (boat, ship, etc.), or air transportation (e.g., airplanes, helicopters, etc.). In this example, the vehicle is illustrated as a car.

As mentioned, the vehicle 1100 includes a LIDAR apparatus having a laser transceiver 1110 and a set of one or more LIDAR front-ends 1120-1 to 1120-4. Although in this example, the LIDAR apparatus includes four (4) LIDAR front-ends, it shall be understood that the LIDAR apparatus may include any number of front-ends. The LIDAR front-ends 1120-1 to 1120-4 may be strategically positioned on the vehicle for optimum or desirable object detection. In this example, the LIDAR front-ends 1120-1 to 1120-4 are positioned near the front-left, front-right, rear-left, and rear-right regions of the vehicle 1100, respectively.

Each of the LIDAR front-ends 1120-1 to 1120-4 may include a WD multiplexer-demultiplexer and an associated lens array, as previously discussed. The laser transceiver 1110 may include a laser source, an optical coupler, an optical amplifier (unidirectional or bidirectional), a WD-Demux, at least one photodetector diode, at least one signal conditioner, and a controller, as previously discussed. As illustrated, the LIDAR front-ends 1120-1 to 1120-4 emit transmit optical signals with wavelengths $\lambda_{11}$-$\lambda_{1n}$, $\lambda_{21}$-$\lambda_{2n}$, $\lambda_{31}$-$\lambda_{3n}$, and $\lambda_{41}$-$\lambda_{4n}$ generally towards the front-left, front-right, rear-left, and rear-right, respectively.

For autonomous or assisted-driving applications, the controller may further process additional information, such as the vehicle's current geographical location, heading, destination, relevant road mapping information, speed and/or acceleration, as well as other parameters that assist in the navigational operation of the. The controller uses the information from the LIDAR apparatus for object detection for steering the vehicle towards a destination in a safe manner.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:
1. An apparatus, comprising:
a laser source configured to generate light with different wavelengths, wherein the laser source is configured to generate the light as light pulses with different wave- lengths at different times to effectuate a time varying spatial transmission pattern;
a wavelength division (WD) demultiplexer configured to redirect the light in different directions based on the different wavelengths, respectively; and
a lens array including an array of lenses configured to collimate the light from the WD demultiplexer for transmission in different directions, respectively.

2. The apparatus of claim 1, wherein the time varying spatial transmission pattern comprises a sweeping light pulse transmission pattern.

3. The apparatus of claim 1, wherein the WD demultiplexer comprises an array waveguide grating (AWG) device.

4. The apparatus of claim 1, wherein the WD demultiplexer comprises a diffraction grating device.

5. The apparatus of claim 1, wherein the WD demultiplexer comprises a volume Bragg grating device.

6. The apparatus of claim 1, wherein the WD demultiplexer comprises a prism.

7. The apparatus of claim 1, further comprising an optical signal routing device configured to route the light with the different wavelengths from the WD demultiplexer to the lenses of the lens array, respectively.

8. An apparatus, comprising:
a laser source configured to generate a set of transmit light pulses with different wavelengths, wherein the laser source is configured to generate the set of light pulses with different wavelengths at different times to effectuate a time varying spatial transmission pattern;
a wavelength division (WD) multiplexer-demultiplexer configured to:
redirect the transmit light pulses from an input to different regions based on the different wavelengths, respectively; and
redirect received light pulses from the different regions to the input;
a lens array including an array of lenses configured to:
collimate the transmit light pulses from the WD multiplexer-demultiplexer for transmission in different directions, respectively; and
collimate the received light pulses, resulting from the transmit light pulses reflecting off at least one object, for routing to the different regions of the WD multiplexer-demultiplexer, respectively;
at least one photodiode detector configured to generate electrical signals based on the received light pulses, respectively; and
an optical coupler configured to:
direct the transmit light pulses from the laser source to the input of the WD multiplexer-demultiplexer; and
direct the received light pulses from the input of the WD multiplexer-demultiplexer to the at least one photodiode detector.

9. The apparatus of claim 8, wherein the time varying spatial transmission pattern comprises a sweeping light pulse transmission pattern.

10. The apparatus of claim 8, wherein the WD multiplexer-demultiplexer comprises an array waveguide grating (AWG) device.

11. The apparatus of claim 8, wherein the WD multiplexer-demultiplexer comprises a diffraction grating device.

12. The apparatus of claim 8, wherein the WD multiplexer-demultiplexer comprises a volume Bragg grating device.

13. The apparatus of claim 8, wherein the WD multiplexer-demultiplexer comprises a prism.

14. The apparatus of claim 8, further comprising an optical signal routing device configured to:
route the transmit light pulses from the WD multiplexer-demultiplexer to the lenses of the lens array, respectively; and
route the received light pulses from the lenses of the lens array to WD multiplexer-demultiplexer, respectively.

15. The apparatus of claim 8, further comprising an optical amplifier configured to amplify the transmit light pulses.

16. The apparatus of claim 15, wherein the optical amplifier comprises an erbium-doped fiber amplifier (EDFA), a ytterbium-doped fiber amplifier (YDFA), or an erbium-ytterbium-doped fiber amplifier (EYDFA).

17. The apparatus of claim 8, further comprising a bidirectional optical amplifier configured to amplify the transmit light pulses and the received light pulses.

18. The apparatus of claim 17, wherein the bidirectional optical amplifier comprises an erbium-doped fiber amplifier (EDFA), a ytterbium-doped fiber amplifier (YDFA), or an erbium-ytterbium-doped fiber amplifier (EYDFA).

19. The apparatus of claim 8, further comprising a controller configured to generate information regarding the at least one object based on the electrical signals generated by the at least one photodiode detector.

20. The apparatus of claim 19, further comprising at least one signal conditioner configured to generate digital signals based on the electrical signals, respectively, wherein the controller is configured to receive the digital signals.

21. The apparatus of claim 8, further comprising a wavelength division (WD) demultiplexer configured to redirect the received light pulses to different regions based on the wavelengths of the received light pulses, respectively.

22. The apparatus of claim 21, wherein the at least one photodiode detector comprises an array of photodiode detectors configured to generate the electrical signals based on the received light pulses of different wavelengths, respectively.

23. The apparatus of claim 22, further comprising a signal conditioner array configured to generate digital signals based on the electrical signals, respectively.

24. The apparatus of claim 23, further comprising a controller configured to generate information of the at least one object based on the digital signals.

25. A vehicle including an apparatus as defined in claim 8 that uses information based on the electrical signals to assist in driving or autonomously drive to a destination.

26. An apparatus, comprising:
a laser source configured to generate light with different wavelengths, wherein the laser source is configured to generate the light as light pulses with different wavelengths at different times to effectuate a time varying spatial transmission pattern;
a 1×N optical splitter configured to power split the light from the laser source to generate a set of optical signals; and
a set of wavelength division (WD) demultiplexers configured to wavelength split the optical signals to generate sets of transmit optical signals with different wavelengths in different wavelength ranges, respectively.

* * * * *